(12) United States Patent
Konno

(10) Patent No.: US 6,843,742 B2
(45) Date of Patent: Jan. 18, 2005

(54) SLIDING CONTACT GUIDE FOR TRANSMITTING MEDIUM

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 207 days.

(21) Appl. No.: 10/341,022

(22) Filed: Jan. 13, 2003

(65) Prior Publication Data

US 2003/0139236 A1 Jul. 24, 2003

(30) Foreign Application Priority Data

Jan. 23, 2002 (JP) .......................................... 2002-014390

(51) Int. Cl.[7] ................................................ F16H 7/08
(52) U.S. Cl. ........................................ 474/111; 403/13
(58) Field of Search ................................ 474/101, 109, 474/111, 123, 140; 403/13, 14, 345, 375

(56) References Cited

U.S. PATENT DOCUMENTS 6,645,102 B2 * 11/2003 Kumakura ................... 474/111
6,669,590 B2 * 12/2003 Kawano et al. .............. 474/140
6,743,130 B2 * 6/2004 Konno et al. ................ 474/111

FOREIGN PATENT DOCUMENTS

| EP | 1 245 864 A2 | 10/2002 |
| EP | 1 306 581 A2 | 5/2003 |
| JP | 10-311395 | 11/1998 |
| JP | 3356765 | 10/2002 |

* cited by examiner

*Primary Examiner*—David A. Bucci
*Assistant Examiner*—Vicky A. Johnson
(74) *Attorney, Agent, or Firm*—Howson and Howson

(57) ABSTRACT

A sliding contact guide for a chain, or other flexible transmission medium comprises a synthetic resin guide body having a shoe on which the transmission medium slides, and a slotted, plate-receiving portion on the back side of the shoe for receiving a reinforcing plate. The plate-receiving portion is composed of a pair of opposed, longitudinally extending, slot-defining walls. Raised ribs, for sandwiching the reinforcing plate, are disposed on opposed inner surfaces of the walls, and are oriented in the direction of insertion of the reinforcing plate into the slot. The guide suppresses shock noises due to wobbling of the guide during operation, and molding and assembly of the guide are enhanced.

1 Claim, 10 Drawing Sheets

SLIDING CONTACT GUIDE FOR TRANSMITTING MEDIUM

FIELD OF THE INVENTION

This invention relates to a sliding contact guide for a power transmission utilizing an endless, circulating, flexible power transmission medium. It relates, for example, to a guide in a chain drive transmission, in which a chain transmits power from a driving sprocket to a driven sprocket, or to a guide in a belt drive transmission, in which a belt transmits power from a driving pulley to a driven pulley.

BACKGROUND OF THE INVENTION

In general, a chain or belt transmission device for valve timing in an internal combustion engine, or for transmitting rotational power in another drive mechanism, includes a chain or belt, which transmits power from a driving sprocket or pulley to one or more driven sprockets or pulleys. The transmission typically includes a pivotally mounted, movable, sliding contact guide, which cooperates with a tensioner, and a fixed sliding contact guide. The movable guide and the fixed guide are attached to a frame of the engine or other drive mechanism by suitable pins, or by bolts or similar mountings. The guides make sliding contact with the chain or belt to apply appropriate tension thereto, and also prevent widthwise vibration and widthwise movement of the chain or belt, causing it to run off the guides.

FIGS. 10 and 11 depict a well known, conventional sliding contact guide 500. The guide comprises a synthetic resin guide body 510, which includes a shoe 511 having a front surface on which a traveling chain slides and a plate-receiving portion 512 on the back side of the shoe. The plate-receiving portion is composed of a pair of walls 512a provided on the back of the shoe 511 and extending in the longitudinal direction of the guide. These walls are spaced from each other to define between them a longitudinally extending slot, which opens in a direction facing away from the shoe. A metallic reinforcing plate 520 is fitted between the slot walls 512a as depicted, for example, in Japanese patent application No. 2000-322380.

As shown in FIGS. 10 and 11, the reinforcing plate has a hole 521 for receiving a pin or bolt on which the guide is pivoted, a tensioner contacting portion 522, and a pair of locking holes 523. The synthetic resin guide body 510 is a complicated structure, comprising a shoe 511, on which a chain slides, and a slotted plate-receiving portion composed of walls 512a, a mounting hole 512b, a boss 512c, outer reinforcing ribs 512d for strengthening the guide, a tensioner contacting portion 512e, and tongues 512f for locking engagement with the holes 523 in the reinforcing plate 520. As illustrated in FIG. 12, in the molding process, the synthetic resin guide body 510 becomes warped through thermal shrinkage due to local variations in the rate of cooling. Warpage takes place in the directions depicted by arrows Y, and results in the formation of gaps S, as shown in FIG. 13, between the walls 512a of the slot and the reinforcing plate 520. As shown in FIG. 13, the width of these gaps increases so that the gaps are wider near the opening of the slot.

Furthermore, the mold draft, provided in order to facilitate removal of the finished guide body from the mold, contributes to the divergence of the gaps S. The gaps cause the metallic reinforcing plate 520 to fit loosely in the guide body 510, and shock noise occurs due to wobbling between the guide body 510 and the reinforcing plate 520 as a chain travels over the guide. The wobbling movement of the reinforcing plate and guide body leads to a significant reduction in the life of the guide.

If the slot gap S is made small in order to avoid the above-described problems, it becomes more difficult to insert the metallic reinforcing plate 520 into the guide body 510, and assembly of the guide becomes more difficult and time-consuming, and in some cases may be impossible. The result is a significant reduction in productivity.

The slot gap in the guide body 510, and the thickness of the reinforcing plate 520 are ideally the same size. However, to mold these parts in the same size is difficult. For example, if the slot gap S is 0.1 mm, the metallic reinforcing plate 520 wobbles. On the other hand, if the thickness of the reinforcing plate 520 is 0.1 mm larger than the width of the slot the reinforcing plate either cannot be inserted into the guide body, or can be inserted only by the use of an excessive inserting force. Thus, excessive accuracy in molding, and very close dimensional tolerances were required.

Accordingly, objects of the invention are to solve the above-described problems of the prior art, and to provide an inexpensive, sliding contact guide for a flexible power transmission medium, which can suppress shock noise due to the wobbling, and which can be assembled rapidly and easily.

BRIEF SUMMARY OF THE INVENTION

The sliding contact guide in accordance with the invention comprises an elongated synthetic resin guide body, which includes a shoe extending along the longitudinal direction of the guide body. The shoe has a front surface arranged to contact a flexible power transmission medium. A plate-receiving portion is provided on the back side of the shoe, and is integrally molded as a unit with the shoe. The plate-receiving portion also extends along the longitudinal direction of the guide body and comprises a pair of opposed walls extending along the longitudinal direction of the guide body and defining a slot between them. A reinforcing plate is inserted into the slot, between said opposed walls. The slot is open along the length of the guide body so that the reinforcing plate can be inserted into the slot in a direction of insertion transverse to the shoe.

The guide body has a mounting hole adjacent one end thereof, and the reinforcing plate has a hole adjacent one end thereof and in register with the mounting hole. Thus, the holes can receive a mounting pin and the guide body and reinforcing plate may be held together in part by engagement of the holes with the mounting pin.

The improvement in accordance with the invention comprises a plurality of raised ribs, formed on the opposed walls. These ribs extend in the direction of insertion of the reinforcing plate, and press against the reinforcing plate.

The materials of the synthetic resin guide body are not especially limited. However, nylon 6, nylon 66, nylon 46, all aromatic nylons and the like, known as engineering plastics, have excellent wear and lubricating properties, and are preferably used. The transmission medium can slide easily on the surface of the shoe when the guide is composed of these materials. When bending rigidity, toughness and strength are required, fiber-reinforced plastics are preferred.

The ribs, which are integrally molded on the slot-defining walls of the guide body, are oriented in the direction of insertion of the reinforcing plate. These ribs may take any of various forms, for example, the ribs may have a semicircular cross-section, a trapezoidal cross-section, a hump-shaped cross-section, a square cross-section, a triangular cross-section and the like. The height of each rib may be uniform over substantially its entire length, or may be uniform over only a part of its length. The ribs may be slightly tapered over part or all of their lengths.

Provided that the material of the reinforcing plate has sufficient bending rigidity and strength, the material from which it is formed is not limited significantly. However, the material of the reinforcing plate is preferably an iron-based metal, a non-ferrous metal such as aluminum, magnesium, titanium or the like, engineering plastics, fiber-reinforced plastics, and the like. For example, even the reinforcing plate having a cutout opening in the thickness direction of the plate, or a weight reduced window portion may be used.

The invention may be embodied in both a fixed sliding contact guide or a movable guide, for example, a tensioner lever.

The guide in accordance with the invention allows a chain, a belt or other power transmission medium to slide in the longitudinal direction of the guide, while applying appropriate tension, suppressing widthwise vibration, and preventing widthwise movement of the traveling transmission medium such that it runs partly off the guide, or disengages the guide entirely.

The ribs, which are raised ribs formed on the slot walls, are oriented in the direction of insertion of the reinforcing plate. Accordingly, the reinforcing plate can be inserted smoothly between the slot walls during assembly, since it moves in the direction of the lengths of the ribs while making linear contact with the ribs. When the reinforcing plate is fully inserted between the slot walls, the ribs sandwich the reinforcing plate, pressing it from both sides. Accordingly, the reinforcing plate is positively held between the slot walls and does not become dislodged from the guide body.

Furthermore, since the ribs formed are disposed in the direction of insertion of the reinforcing plate, that is, in a direction transverse to the shoe, from the back side of the shoe toward the medium-engaging surface thereof, the load exerted on the shoe by the transmission medium is sustained in part by the ribs, and thus the ribs themselves contribute to the bending rigidity, toughness, and strength of the guide. In addition, hollow spaces, having widths corresponding to the heights of the ribs, are produced between the walls of the guide body and the reinforcing plate. These spaces contribute to the release of heat generated by sliding friction in the operation of the guide.

When the mounting hole in the guide body and the hole in the reinforcing plate are aligned with each other and receive a fastener the sandwiching of the reinforcing plate by the ribs is further enhanced. Accordingly, contact vibration between the guide body and the reinforcing plate, which is produced during operation of the guide, is suppressed substantially completely.

DETAILED DESCRIPTION OF THE PREFERRED EMBODIMENTS

Figure 1:
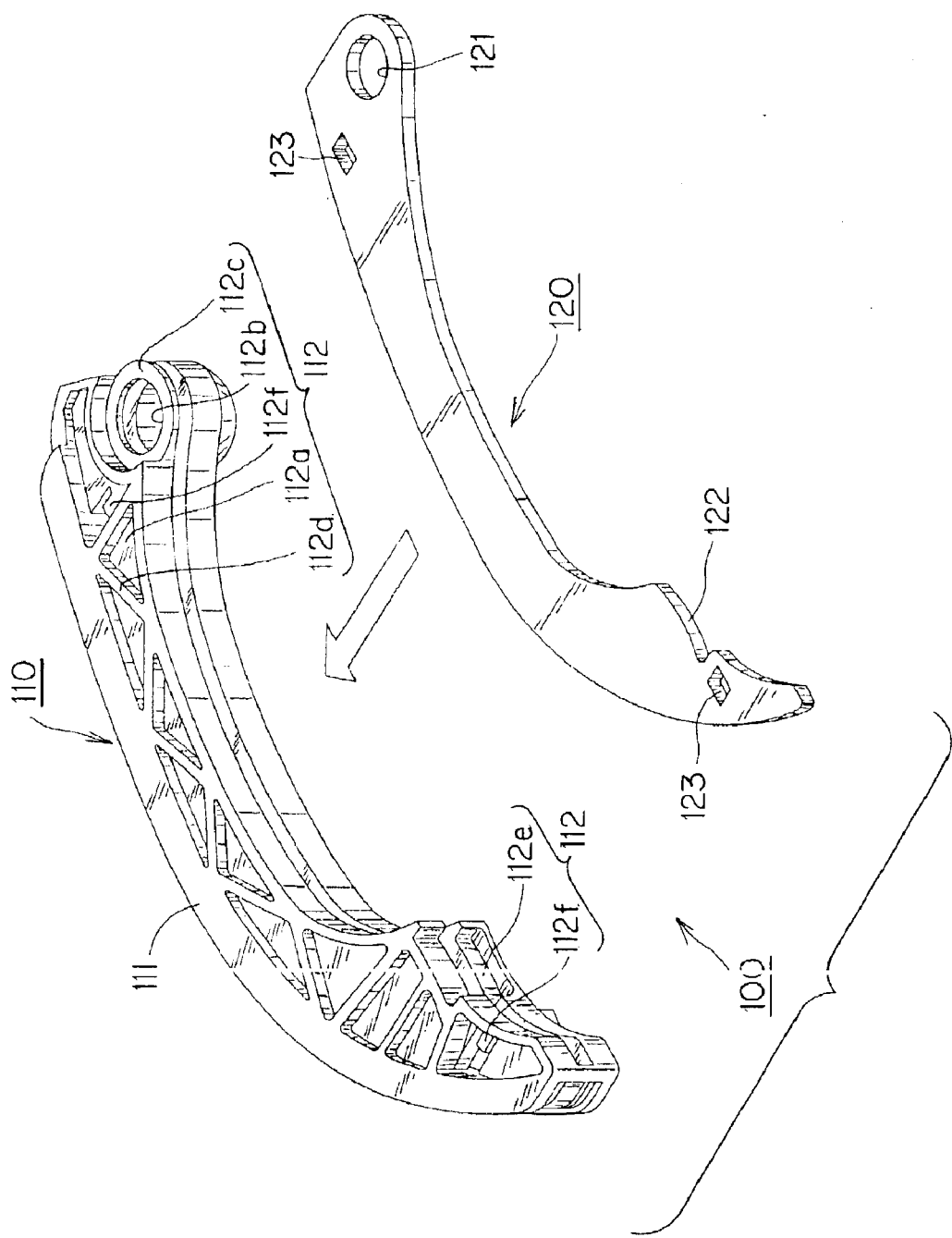
FIG. 1 is an exploded perspective view of a sliding contact guide according to a first embodiment of the invention.

The sliding contact guide 100 shown in FIG. 1 is a sliding contact guide designed to serve as a tensioner lever. This guide is pivotally attached to an engine about a mounting shaft of the engine to maintain appropriate tension in a chain as the chain slides on the guide. The guide 100 is a two piece structure comprising an integrally molded, synthetic resin guide body 110 and a metallic reinforcing plate 120 punched from a steel sheet. The guide is produced by incorporating the reinforcing plate 120 into the guide body 110 by inserting the plate in the direction of the arrow as shown in FIG. 1.

This guide body 110 comprises a shoe 111 having a sliding surface on which a traveling chain slides, and a plate-receiving portion 112 on the back side of the shoe 111, composed of a pair of opposed walls 112a, which extend along the longitudinal direction of the guide. The plate receiving portion 112 includes a boss 112c having a mounting hole 112b for mounting the guide on a pivoting pin, bolt or the like fixed to the frame of an engine. The plate-receiving portion has a plurality of outer ribs reinforcing 112d for reinforcing the guide body. A tensioner contact portion 112e is provided for making contact with the plunger of a tensioner (not shown). Tongues 112f are provided for locking engagement with holes 123 in the reinforcing plate 120.

Figure 2:
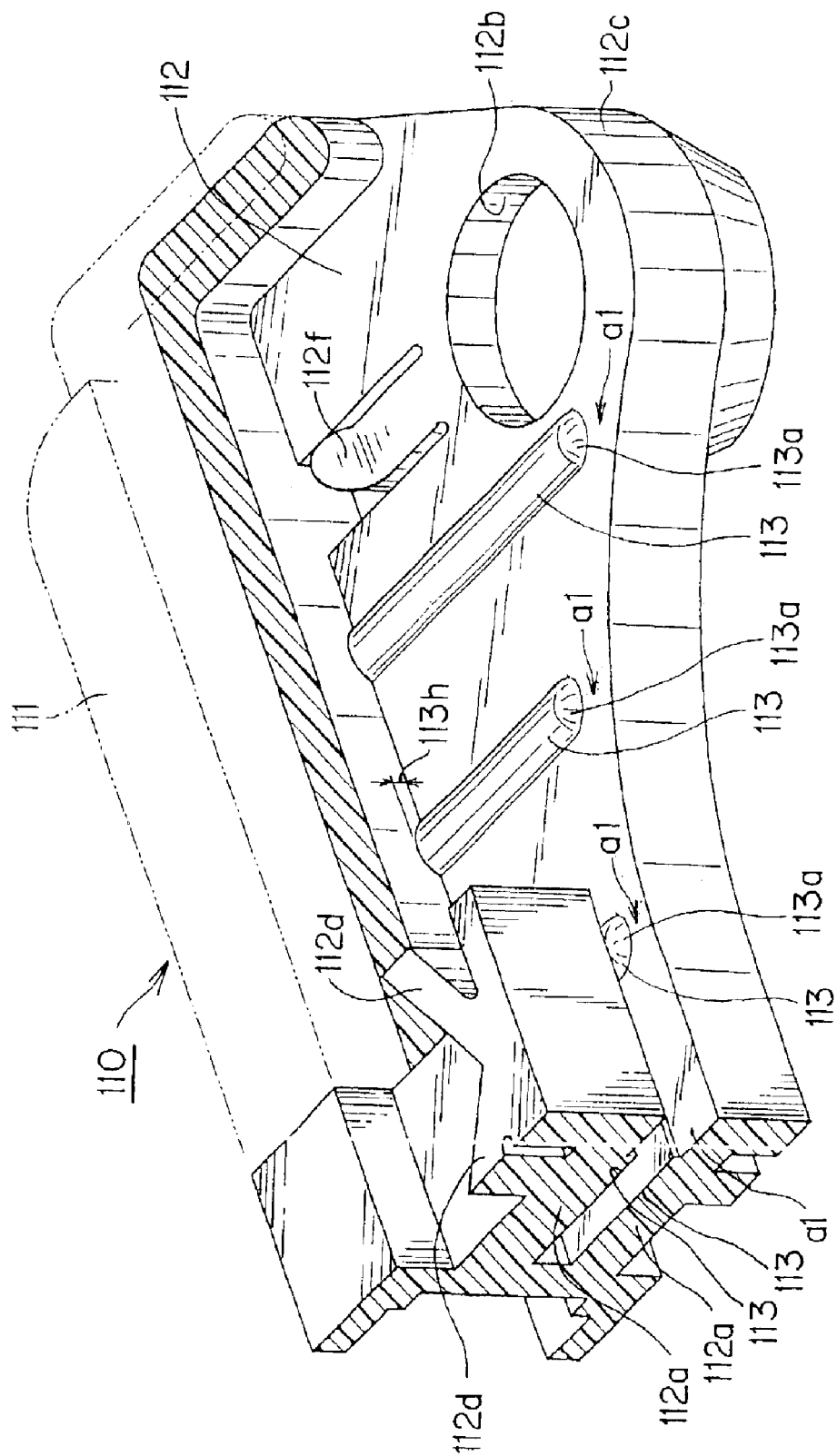
FIG. 2 is a partially cut-away perspective view of a part of the guide body of the guide in FIG. 1.

As shown in FIG. 2, inner ribs 113 are disposed at intervals on the inner surfaces of the walls 112a. These ribs are raised from the inner surfaces of the walls, and extend in the direction of insertion of the reinforcing plate. In FIG. 2, the ribs have a uniform height 113h, and a semicircular cross-section, except at their rounded ends 113a. The ribs 113 allow the reinforcing plate 120 to be inserted smoothly between the pair of walls 112a while the reinforcing plate 120 makes linear contact with the ribs 113.

The ribs 113 are slightly spaced inwardly from the opening of the slot defined by walls 112a, so that such regions a1 are formed as shown in FIG. 2. These regions allow the reinforcing plate 120 to be positioned easily, and inserted between the walls 112a in process of assembling the guide.

Figure 3:
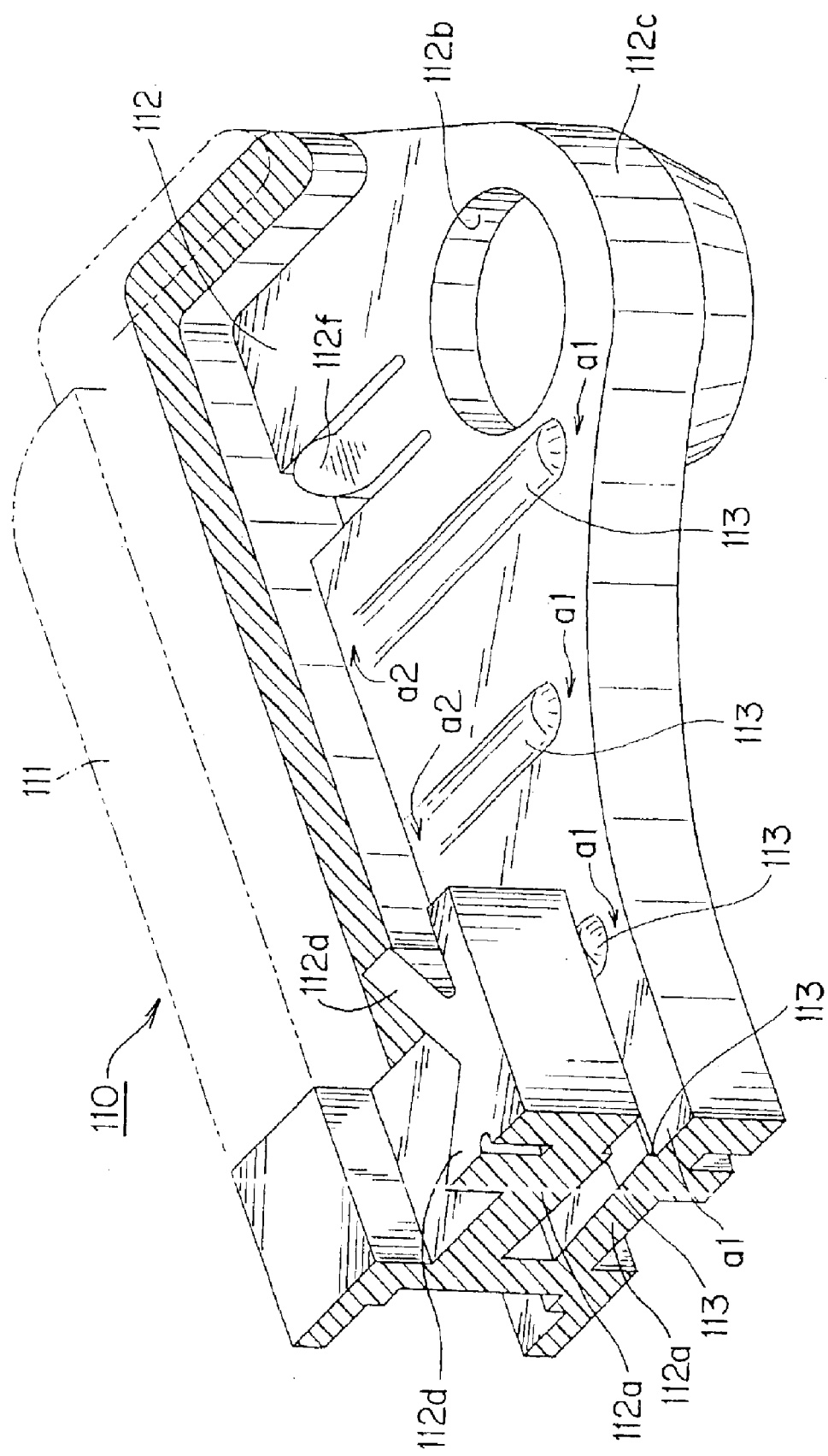
FIG. 3 is a partially cut-away perspective view, corresponding to FIG. 2, but showing part of a modified guide body.

In the modified version of the guide, as shown in FIG. 3, the ribs 113 are tapered, their heights gradually diminishing, proceeding along the ribs in a direction toward the inside of the slot. In this case, regions a2 are formed beyond the locations at which the inner ends of the tapered ribs merge with the walls 112a.

Figure 4:
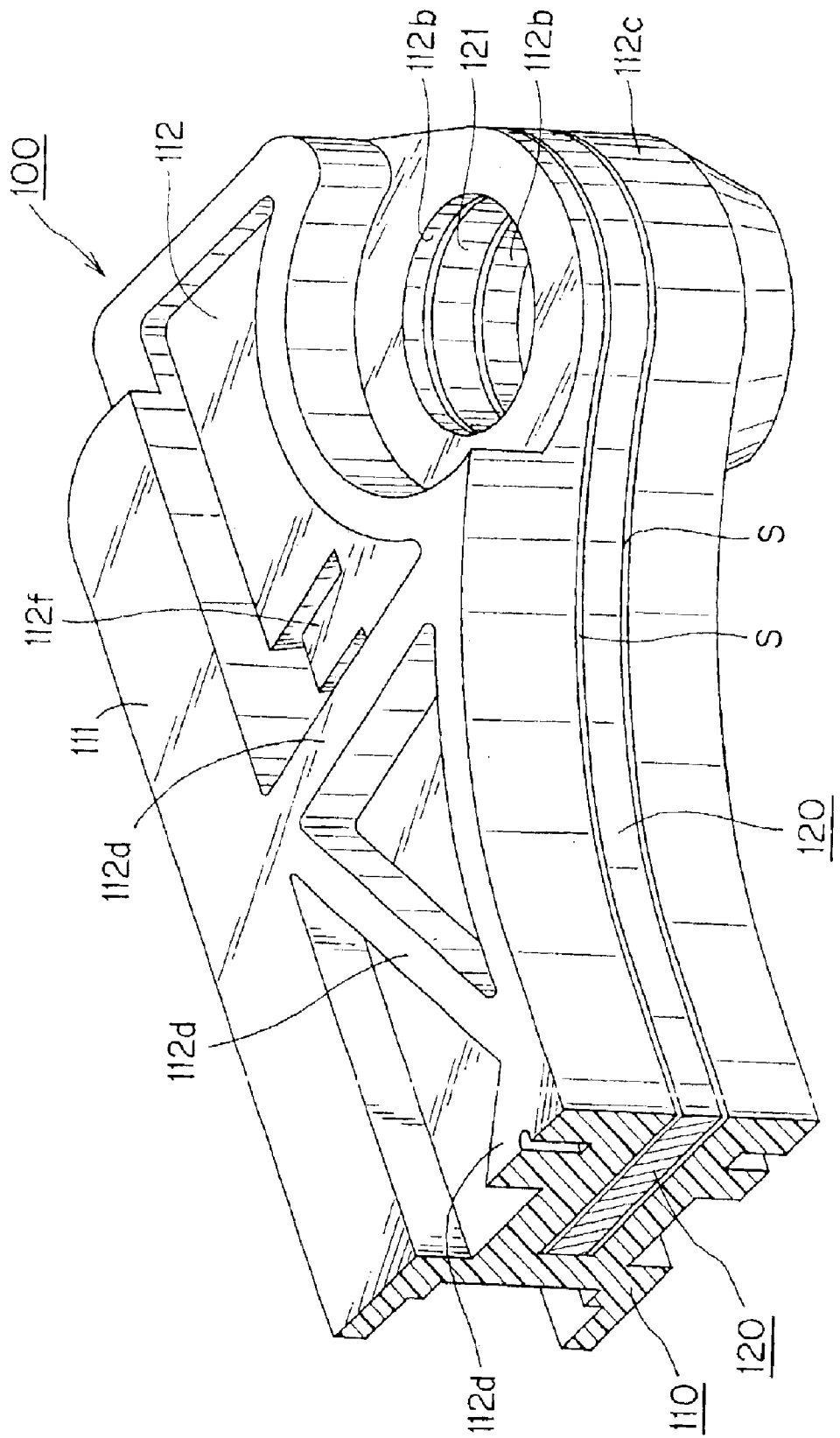
FIG. 4 is a partially cut-away perspective view of a part of the guide body of the guide in FIG. 1, showing the reinforcing plate in place in the slot of the guide body.
Figure 5:
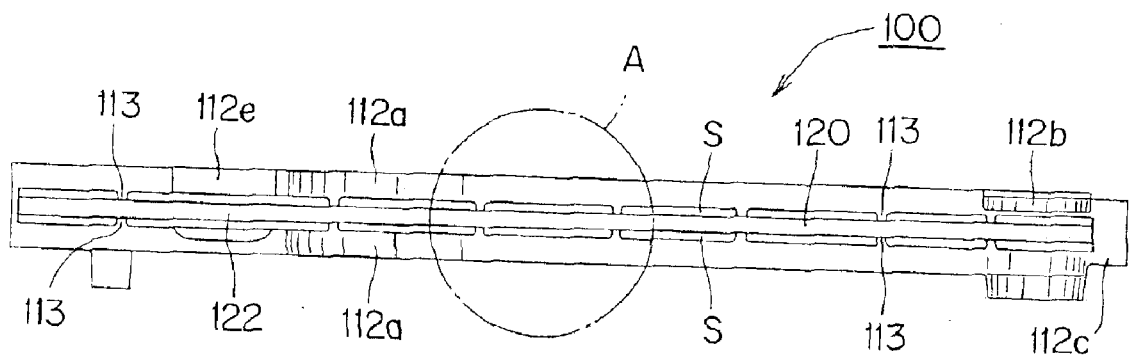
FIG. 5 is an elevational view of the guide of FIG. 1, showing the reinforcing plate in place.
Figure 6:
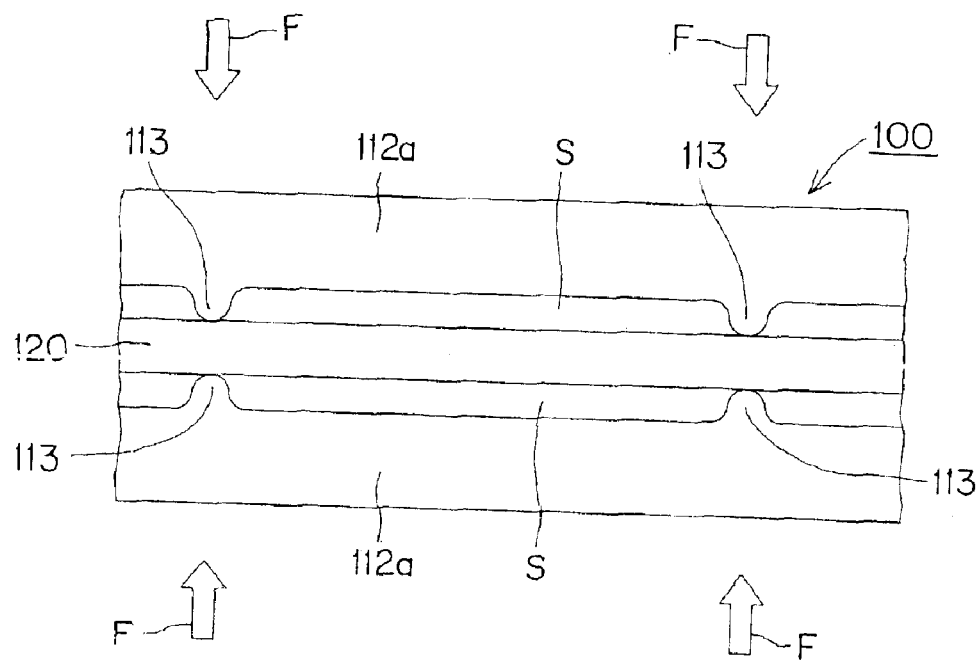
FIG. 6 is an enlarged view of a portion labeled "A" in FIG. 4.

As shown in FIGS. 4 to 6, when the reinforcing plate 120 is inserted between the pair of walls 112a, the ribs 113 formed on the respective walls 112a press the reinforcing plate 120 from both sides to produce a sandwiching force F. Accordingly, the reinforcing plate 120 is positively held between the slot walls 112a without being dislodged, while slot gap S are formed between the plate and the inner surfaces of the walls of the guide body.

Since the ribs 113 formed are oriented in the direction of insertion of the reinforcing plate 120, that is, in a direction transverse to the shoe, from the back side of the shoe 111 toward the transmission medium-contacting surface side thereof, the load exerted on the shoe 111 by the transmission medium is sustained in part by the ribs 113. In addition, since hollow spaces, having widths corresponding to the heights of the ribs, are produced between the inner surfaces of the walls of the guide body 110 and the reinforcing plate 120, heat due to sliding friction generated at the shoe 111 is released more rapidly due to the increased surface are resulting from these hollow spaces.

Figures 7A, 7B, 7C, 7D, 7E:
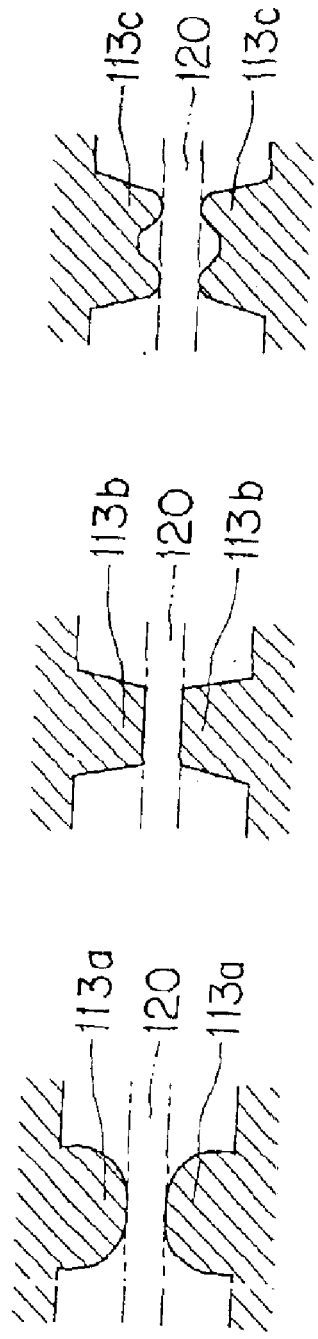
FIGS. 7(a)–7(e) are schematic sectional views, showing, respectively, semicircular, trapezoidal, hump-shaped, square, and triangular ribs.

The ribs 113 may be in any of various cross-sectional shapes. For example semicircular ribs 113a are shown in FIG. 7(a), trapezoidal ribs 113b are shown in FIG. 7(b), hump-shaped ribs 113c are shown in FIG. 7(c), square ribs 113d are shown in FIG. 7(d), and triangular ribs 113e are shown in FIG. 7(e).

The reinforcing plate 120 includes a hole 121, which is fastened on a mounting bolt (not shown) together with the mounting hole 112b of the guide body 110. A tensioner contacting portion 122, is provided to make contact with a plunger of a tensioner (not shown) attached to an engine frame, in order to allow the tensioner to control the tension in a chain or other transmission medium sliding on the guide.

As mentioned previously, the locking holes 123 formed in the reinforcing plate are engaged by tongues 112e in the guide body 110. Thus, when the guide body 110 is attached to an engine frame or the like, the effect of the sandwiching force F exerted by the ribs 113 on the reinforcing plate is supplemented, and the reinforcing plate 120 is not dislodged from the guide body 110. Accordingly, the contact vibration between the guide body 110 and the reinforcing plate 120, which is produced due to a traveling transmission medium, can be suppressed substantially completely.

Even if the guide body 110 and the reinforcing plate 120 have different coefficients of thermal expansion, the reinforcing plate 120 will not be broken. The reinforcing plate is secured against longitudinal movement relative to the guide body only at the location of the aligned holes 121 and 112b adjacent the pivoted end of the guide. The guide body 110 and the reinforcing plate 120 are otherwise free to expand and contract relative to each other in the longitudinal direction so that effects due to thermal deformation are avoided.

The movable guide 100 has significantly improved bending rigidity, toughness, strength and wear properties, it can apply appropriate tension to a transmission medium, and stable travel of the transmission medium can be achieved without widthwise vibration or widthwise movement of the transmission medium off the shoe to the side thereof.

Since the ribs 113, which sandwich the reinforcing plate 120, are arranged so that they extend along the direction of insertion of the reinforcing plate 120, the reinforcing plate can be inserted smoothly between the pair of walls 112a during assembly of the guide, and the labor required to assemble the guide is reduced remarkably. Even if the closer dimensional tolerances are imposed in the molding of the guide, productivity in the assembly of the guide can be significantly enhanced, and shock noises due to wobbling of the guide during operation can be suppressed.

Figure 8:
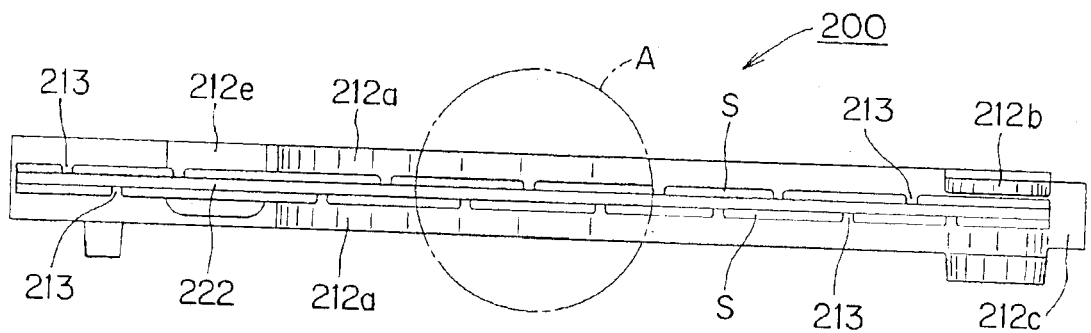
FIG. 8 is an elevational view of a sliding contact guide according to another embodiment of the invention.
Figure 9:
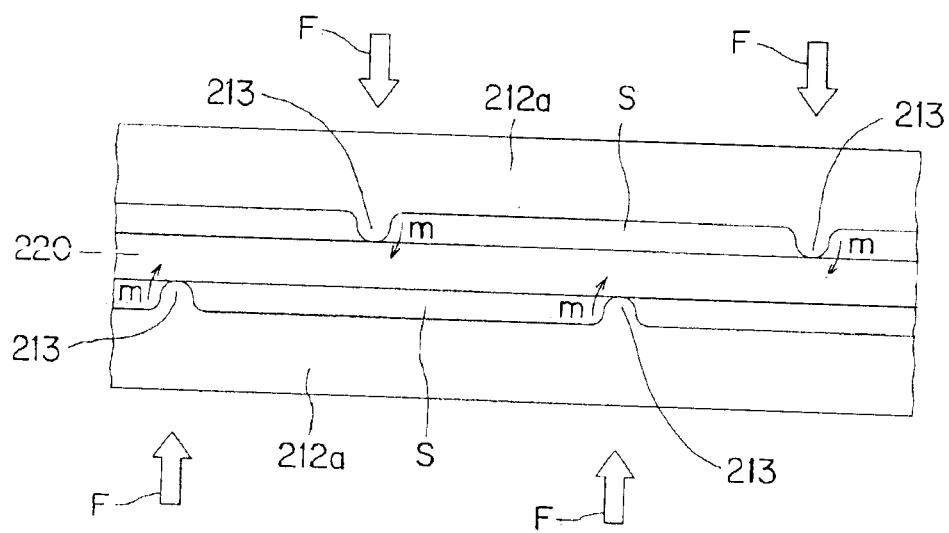
FIG. 9 is an enlarged view of a portion labeled "A" in FIG. 8.
Figure 10:
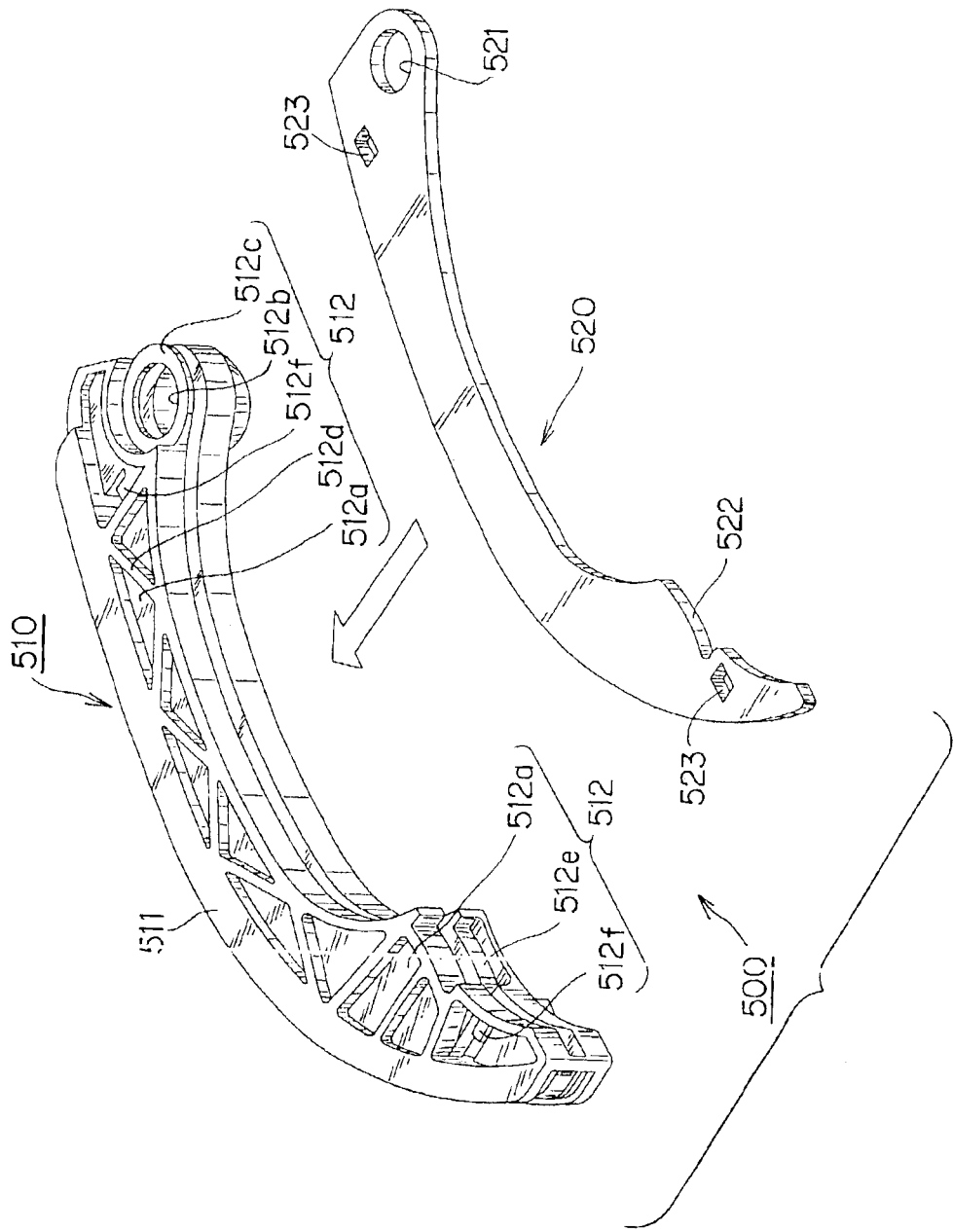
FIG. 10 is an exploded perspective view of a conventional sliding contact guide.
Figure 11:
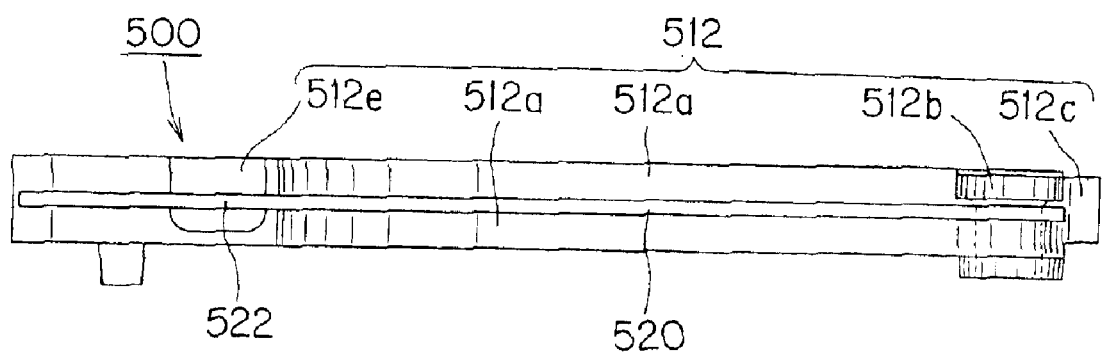
FIG. 11 is an elevational view of the guide of FIG. 10, showing the reinforcing plate in place in a slot in the guide body.
Figure 12:
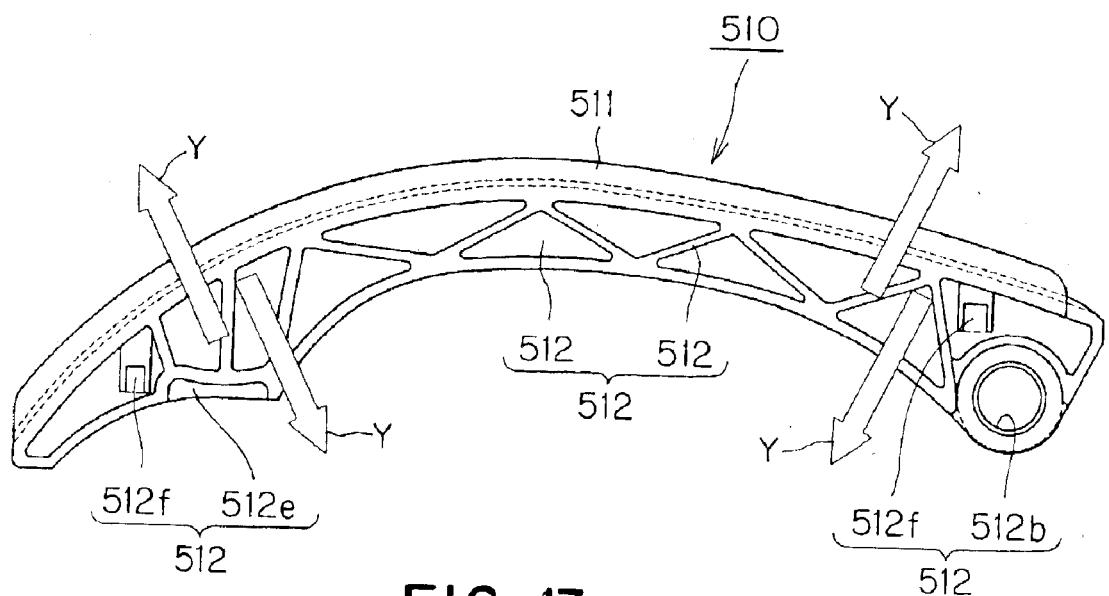
FIG. 12 is an schematic elevational view illustrating strain due to thermal shrinkage in a conventional sliding contact guide.
Figure 13:
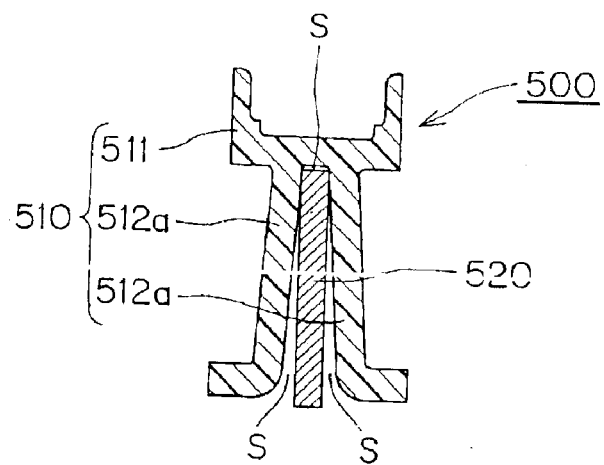
FIG. 13 is transverse cross-section of a conventional sliding contact guide, illustrating a mold draft.

FIGS. 8 and 9 show a sliding contact guide 200 in accordance with another embodiment of the invention. This guide has the same basic structure as that of the guide of FIG. 1, but differs in that ribs 213 on opposite sides of the reinforcing plate 120 are offset from one another.

The movable guide 200 exhibits the same effects as obtained with the movable guide 100. The reinforcing plate 220 can be inserted smoothly between a pair of walls 212a while making linear contact with the ribs 213. In this case, however, the ribs can more positively hold the reinforcing plate 220 to the guide body, since a slight bending moment m, as shown in FIG. 9, is produced in the reinforcing plate at the locations of the ribs.

The more important beneficial effects of the invention may be summarized as follows. The bending rigidity of the entire guide, and its toughness, strength and wear properties are significantly improved. When the guide is attached to a transmission device such as an engine or the like it can apply appropriate tension to a traveling transmission medium, and can ensure stable travel of the medium without widthwise vibration and widthwise movement of the medium off the shoe of the guide.

Furthermore, since ribs for sandwiching the reinforcing plate are oriented in the direction of insertion of the reinforcing plate, the plate can be smoothly inserted between the walls of the guide body without excessive resistance, and is guided by linear contact with the ribs during assembly. The difficulty of assembly of the guide is significantly reduced. Moreover, even if the closer dimensional tolerances are imposed, the guide can be produced inexpensively and with improved productivity.

The ribs formed on the respective walls press the reinforcing plate from both sides to produce a sandwiching effect, which positively holds the reinforcing plate against dislodging from the guide body. Even if the dimensional tolerances in the guide molding process are increased, shock noise due to wobbling of the guide in operation can be suppressed.

Since the ribs are oriented in the direction of insertion of the reinforcing plate, the load exerted on the shoe by the traveling transmission medium is sustained in part by the ribs, so that the bending rigidity, toughness, strength of the guide is improved. Moreover, the hollow spaces between the ribs, which have widths corresponding to the heights of the ribs, provide additional surface area for the release of heat generated by sliding friction at the shoe as a result of travel of the transmission medium over the shoe. The dissipation of heat in this way ensures proper retention of the guide.

The alignment of the holes in the guide body and the reinforcing plate and the engagement of both holes with a pivoting pin, bolt or the like, enhances the sandwiching effect of the ribs on the reinforcing plate. Accordingly, vibration between the guide body and the reinforcing plate, which is generated due to travel of the transmission medium over the shoe of the guide body, is suppressed, and noise due to vibration can be suppressed substantially completely.

I claim:

1. A sliding contact guide for a flexible transmission medium comprising an elongated synthetic resin guide body, said guide body including a shoe extending along the longitudinal direction of the guide body, said shoe having a front surface arranged to contact a transmission medium, and a back side, and a plate-receiving portion provided on said back side of the shoe and integrally molded as a unit with said shoe, the plate-receiving portion also extending along the longitudinal direction of the guide body and comprising a pair of opposed walls extending along the longitudinal direction of the guide body and defining a slot between them, and a reinforcing plate inserted in said slot, between said opposed walls, said slot being open along the length of said guide body whereby said reinforcing plate can be inserted into the slot in a direction of insertion transverse to said shoe;

said guide body having a mounting hole adjacent one end thereof, and said reinforcing plate having a hole adjacent one end thereof and in register with said mounting hole whereby said holes can receive a mounting pin and said guide body and reinforcing plate are held together in part by the engagement of said holes with the mounting pin, and wherein the improvement comprises a plurality of raised ribs formed on said opposed walls, said ribs extending in said direction of insertion of the reinforcing plate and pressing against said reinforcing plate.

* * * * *